March 17, 1931.  F. J. BOHN  1,797,121
MICROMETER GAUGE FOR INTERNAL THREADS
Filed May 25, 1929   2 Sheets-Sheet 2
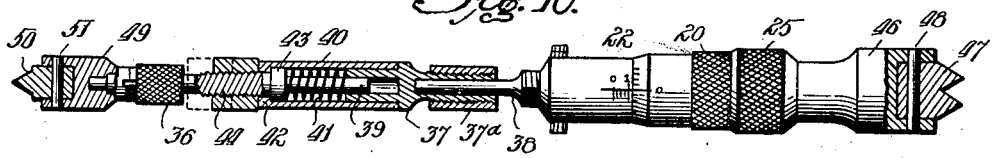
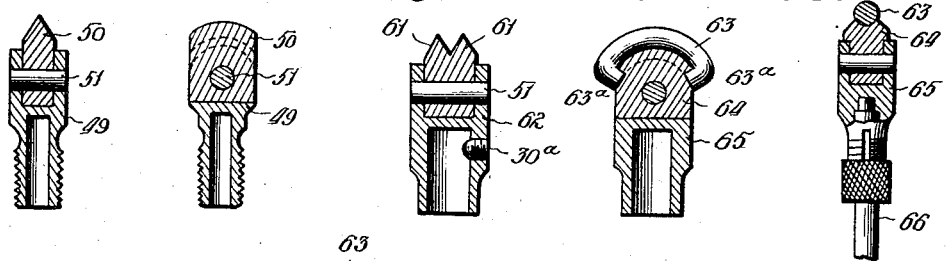
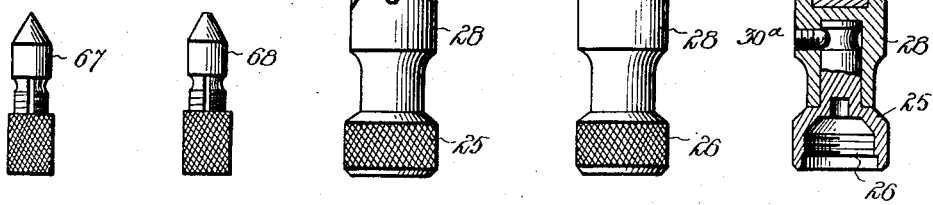
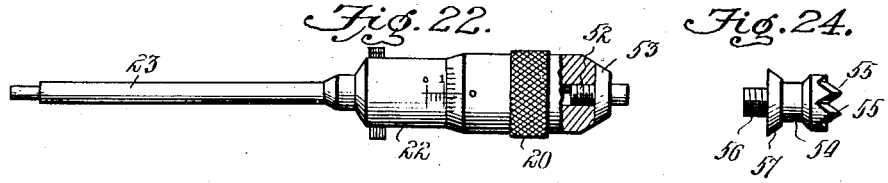
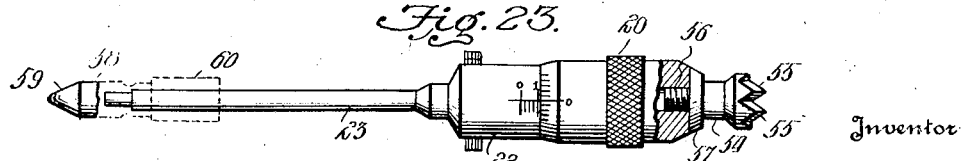
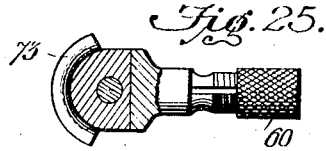
Inventor
Frank J. Bohn,
Attorney Patented Mar. 17, 1931

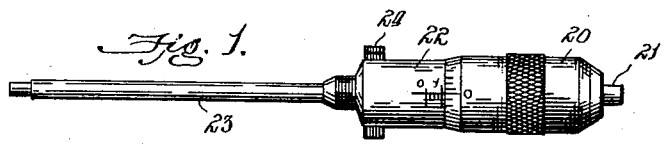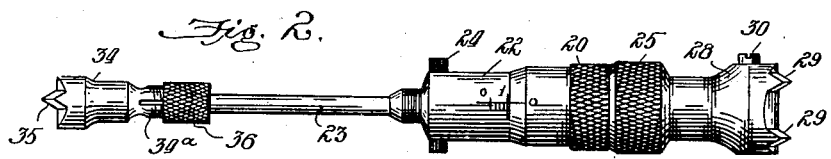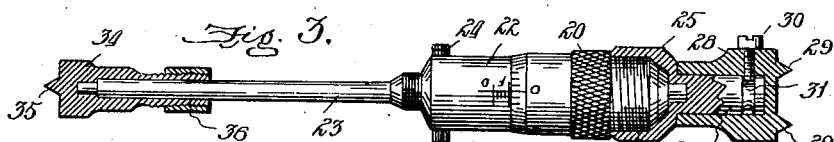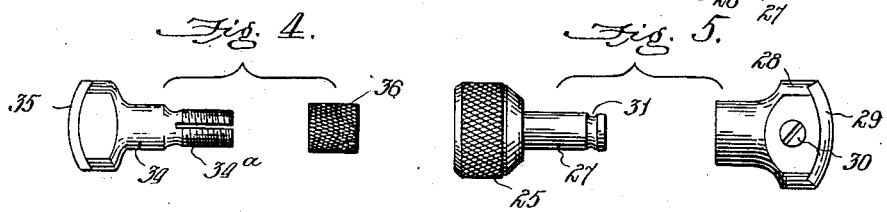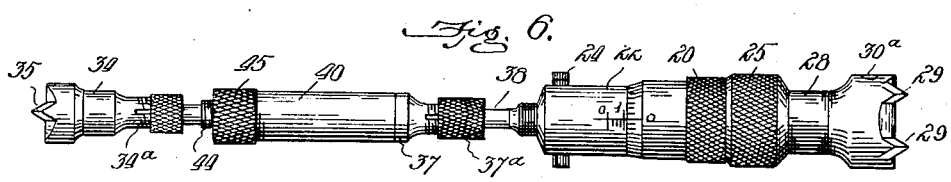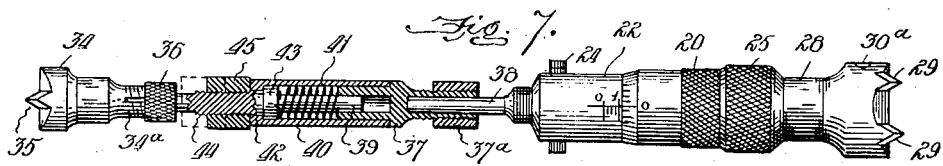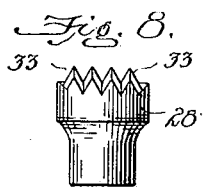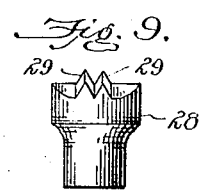

1,797,121

UNITED STATES PATENT OFFICE

FRANK J. BOHN, OF WASHINGTON, DISTRICT OF COLUMBIA

MICROMETER GAUGE FOR INTERNAL THREADS

Application filed May 25, 1929. Serial No. 365,980.

My invention is an improvement in micrometer gauges, and relates more especially to that particular type employed for accurately measuring the internal threads of a cylinder for fitting one part within another, as for instance an externally threaded cylinder bar or shaft to an internally threaded cylinder.

The primary object of my invention is to provide attachments for a conventional type of inside micrometer gauge which will adapt it for more conveniently and accurately measuring the internal screw threads of a cylinder to correspond with the diameter of external threads on a cylinder bar or shaft to be fitted tightly within the threaded portion of the internally threaded cylinder.

A further object of my invention is to provide attachments for the above mentioned purpose which can be applied to a well known type of micrometer gauge for inside measurements without requiring material alteration thereof to receive the attachments, and which will not affect the ordinary use of the micrometer gauge when desired.

A further object of my invention is to provide attachments for a micrometer gauge in which the end pieces of said attachments engage the threads at opposite sides of the internally threaded bore of the cylinder are removable so that any one of a variety of end pieces may be used in connection with a single set of my improved attachments.

With the foregoing principal objects in view my invention consists in end pieces for attachment to a micrometer gauge of the type referred to, and means for detachably connecting said attachments to the opposite ends of a micrometer gauge, as well as in the particular construction of the attachments, all as hereinafter fully described and specifically set forth in the appended claims.

In the drawings forming a part of this specification

Figure 1 is a side elevation of a conventional type of micrometer gauge for measuring internal diameters.

Fig. 2 is a similar view illustrating the application of my invention thereto.

Fig. 3 is a side elevation of the micrometer gauge with the attachments shown in longitudinal section.

Fig. 4 is a view illustrating the attachment at the outer end of the micrometer gauge, the parts being separated.

Fig. 5 is a similar view of the attachment at the inner end of the gauge.

Fig. 6 is a side elevation illustrating a modification of my invention to provide for longitudinal movement of the attachment at the outer end of the micrometer gauge without disturbing the measurement.

Fig. 7 is a similar view, the parts of the slidable attachment being shown in section.

Figs. 8 and 9 show modifications in the formation of the outer ends of the attachment used at the inner end of the micrometer gauge.

Fig. 10 is a view similar to Fig. 7 with the toothed portions of the end pieces detachably connected.

Figs. 11 and 12 are detail sectional views of the end pieces at the outer end of the gauge.

Fig. 13 is a detail sectional view showing a modification of the set screw forming part of the swivel connection.

Figs. 14, 15, and 16 are views showing the thread engaging teeth formed of wires.

Figures 17 and 18 are detail views of different forms of points used at the outer end of the gauge.

Figs. 19 and 20 are modifications in the shape of the thread engaging teeth.

Fig. 21 is a sectional view of a modification of the attachment at the inner end of the gauge.

Fig. 22 is a view of a standard type of micrometer gauge the inner end being broken away to show the attachment of the short rod or pin thereto.

Fig. 23 is a similar view showing the application of my attachment.

Figure 24 is a detail view of this form of the attachment, and

Fig. 25 is a detail view showing one form of attaching the wires to the cut-away teeth.

Like numerals of reference indicate like parts in the several views of the drawings.

My improved attachments are adapted to be applied to a micrometer gauge for inside measurements such as illustrated in the drawings, comprising a head 20 having a short rod 21 for engaging the internally threaded bore of a cylinder, and a member 22 slidable in said head and having a longer rod 23 secured therein by set screw 24, the sleeve portion at the inner end of the head having graduations registering with graduations on the slidable member. As the micrometer gauge is of a conventional type and of well known construction further detail description of the same as well as the operation thereof is unnecessary.

In carrying out my invention as illustrated in Figs. 2 to 9 inclusive (Sheet 1 of the drawings) the attachment at the inner end of the micrometer gauge comprises a member 25 having a socket 26 at one end and a pintle 27 at the other end on which is swivelled a member or end piece 28 having projecting teeth 29 adapted to fit into or between the threads of the cylinder, the swivelled member or end piece being rotatably connected to the pintle by set screw 30 extending laterally through one side of the same to engage a circumferential groove 31 near the outer end of said pintle. I preferably employ an ordinary form of set screw, as shown in Figs. 2 and 3, and in some instances cut off the head of the screw as shown in Figs. 6, 7, 13, and 21, and indicated at 30a. The member 25 of the attachment is adapted to fit over the head of the micrometer gauge, the outer end of the latter being received in the socket 26, and although any well known means may be employed for connecting these parts together screw threads are preferred, as illustrated in the drawings, it being noted that the socket in the detachable member is countersunk to receive the short rod 21 of the micrometer gauge, and that the outer surface of the body portion of said member is knurled for gripping the same in attaching and detaching it. In Figs. 2 and 3 of the drawings I have shown two spaced apart teeth 29 forming the portions which engage between the internal threads of the cylinder, but it will be understood that the two teeth may be also arranged as shown in Fig. 9 or a plurality of teeth 33 employed, as shown in Fig. 8. The attachment described may cooperate with the longer rod 23 of the micrometer gauge in making measurements but I prefer to use in connection therewith the attachment shown to provide a tooth which will engage between threads at the opposite side of the internal diameter of the cylinder from the teeth on the attachment hereinbefore described, this attachment for the rod comprising an end piece or member 34 having the tooth 35 and bored from its inner end to receive the outer end of the rod, the inner split end 34a of said end piece being slightly tapered and threaded to receive a nut 36 for clamping the attachment on the rod.

As a modification of the form of attachments described I provide for sliding the end piece or attachment out of engagement with the threads of the cylinder, said slidable attachment consisting of a member 37 clamped on the removable rod 38 of the micrometer gauge by nut 37a and bored at its outer end to receive a supplemental rod 39 slidable in said bore and in a sleeve 40 fitting over the reduced outer end of the member 37 to which it is secured preferably by threads and having an inwardly projecting annular flange 42 at its outer end between which flange and outer end of the aforesaid member a collar 43 on the rod works to limit the sliding movement of said rod, and for projecting the rod to its normal outward position a helical spring 41 is interposed between the collar on the rod and the outer end of the member over which the sleeve is attached. The rod is held at its outermost position by a nut 45 threaded on the projecting portion 44 of the rod, as shown, and the outer end of the rod is adapted to receive the attachment hereinbefore described with reference to Figs. 1 and 2.

In the operation of the complete micrometer gauge shown in Fig. 2 the teeth at the ends of the attachments at both ends of the gauge are engaged with the internal threads of the cylinder at opposite sides of the bore and the gauge is adjusted in the usual manner to obtain the measurement after the manner of the ordinary type of internal micrometer gauge, in this instance however the swivelled end piece 28 permits the teeth at both ends of the device to properly engage the thread, and by providing the slidable rod 39 carrying the attachment at the opposite end from the head the teeth may be placed in and out of engagement with the thread on the inner side of the cylinder without disturbing the measurement, in this operation the nut 45 being turned away from the end of the sleeve 40 a sufficient distance to clear the thread in the cylinder. Thus it will be seen that in measuring the diameter of an internally threaded cylinder the teeth on the attachments will provide for an accurate measurement by contact with the walls of the threads, while the additional attachment forming a part of the longer rod of the micrometer gauge and including the spring actuated auxiliary rod will permit the length of the gauge to be shortened for fitting it in the cylinder as well as removing it therefrom. With respect to either attachment the teeth for engaging the internal thread of the cylinder may be formed integrally with the end piece as in Fig. 3 or as a separate element as in Fig. 10 so as to be detachable for varying the type of teeth or thread engaging portions of the attachments; that is, the end piece 46 at one end is recessed to receive the toothed element 47 secured in place by pin 48, while the other end piece 49 is likewise recessed to receive the detachable toothed element 50 held in place by pin 51, a slight modification of the last mentioned detachable element being shown in Figs. 11 and 12.

In the form of my invention shown on Sheet 2 of the drawings the attachment on the head of the micrometer gauge takes the place of the usual removable short rod having the threaded shank 52 (see Fig. 22) by which it is threaded into the head and collar 53 forming a stop; my attachment in this instance comprising an end piece 54 having spaced apart teeth 55 with a threaded shank 56 and stop collar 57, said shank and collar corresponding to the like parts of the removable short rod so that the attachment may be substituted therefor, and instead of a tooth on the attachment 58 at the other end of the gauge it may be provided with a truncated point 59, this attachment being also secured on the removable rod of the gauge by means of a nut or threaded sleeve 60, and of course these attachments may be used also in connection with the slidable rod attachment shown in Figs. 6, 7, and 10, and hereinbefore described, being used in like manner to the operation described with reference to the form of my invention shown on Sheet 1.

On this Sheet 2 of the drawings I have shown different forms of teeth which may be used on the end pieces of the attachments, Fig. 13, showing a pair of teeth 61—61 on the end piece 62; Fig. 14 showing a wire 63 as the engaging portion of the detachable element 64 of the end piece 65; and Fig. 15 also showing the wire 63 on the detachable element 64 of the end piece 65 used on the rod 66 at the outer end of the gauge; while Figs. 17 and 18 show different forms of conical ends 67 and 68, respectively, and Figs. 19 and 20 illustrate two types of teeth that may be used, the tooth 69 in Fig. 19 being blunt and tooth 70 in Fig. 20 rounded. Fig. 21 shows the engaging portion of the two teeth in the form of arcuate wires 71, as in Fig. 14, attached to the detachable element 72 either by sweating them on, as shown at 73 in Fig. 25 or by turning the ends 63a abruptly into recesses as shown in Fig. 14, it being noted that the wires are bent into arc-shape to conform to the teeth to which they are secured and are round in cross-section the diameter of which corresponds with the pitch of the thread.

From the foregoing description it will be obvious that my invention consists broadly in the proposition of providing attachments for the opposite ends of an inside micrometer gauge which will not only facilitate measuring the diameter of an internally threaded cylinder but will permit the measurements to be more accurately made than by the use of the ordinary form of micrometer gauge, and that the attachments can be readily and cheaply applied to the conventional type of gauge such as illustrated in the drawings by simply threading the outer portion of the head or otherwise securing one of the attachments thereto, as for instance shown in Fig. 23, the other attachment being simply clamped on the outer end of the removable rod of the micrometer gauge, and consequently said attachments may be manufactured and sold in the form of attachments or in connection with the gauge.

I claim:

1. An attachment for the head of a micrometer gauge used in measuring the diameter of internally threaded cylinders comprising a member secured on said head and having an outwardly projecting pintle, and an end piece swivelled on said pintle and provided with projecting teeth for engaging between the walls of the thread in the cylinder.

2. An attachment for the head of a micrometer gauge used in measuring the diameter of internally threaded cylinders comprising a member having a socket to receive the outer end of the head, means for securing the member to the gauge head, a pintle projecting outwardly from said member, and an end piece swivelled on the pintle and having outwardly projecting teeth for engaging the thread in the cylinder.

3. An attachment for the head of a micrometer gauge used in measuring the diameter of internally threaded cylinders comprising a member having a socket to receive the end of the head, means for securing the member to the gauge head, a pintle projecting outwardly from said member and having a circumferential groove, an end piece rotatably mounted on the pintle, and a set screw extending through one side of said end piece to engage the aforesaid circumferential groove.

4. An attachment for an inside micrometer gauge for measuring internal threads comprising an arc-shaped tooth and an arc-shaped wire inset in the outer end of said tooth.

5. An attachment for an inside micrometer gauge for measuring internal threads comprising arc-shaped spaced teeth the outer ends of which are grooved, and arc-shaped wires set into the grooves of the teeth and secured thereto.

6. An attachment for an inside micrometer gauge for measuring internal threads comprising arc-shaped spaced teeth the outer ends of which are grooved, and arc-shaped wires set into the grooves of the teeth and secured thereto by turning the ends into recesses at the ends of the teeth.

7. An attachment for the head of a micrometer gauge used for measuring the diameter of an internally threaded cylinder comprising a member secured on said head and having an outwardly projecting pintle, and an end piece swivelled on said pintle and having a centrally cut slot at its outer end, an inset piece lodged in the slot and secured by a pin passing through the parts transversely, said inset piece terminating in arc-shaped centrally spaced teeth angular in cross-section to contact with the angular sides of the threads in the cylinder.

8. An attachment for a micrometer gauge used for measuring the diameter of internally threaded cylinders comprising a member secured on said head and having an outwardly projecting pintle, and an end piece swivelled on said pintle, said end piece having a centrally cut slot at its outer end, of an inset piece lodged in the slot and secured by a pin passing through the parts transversely, said inset piece terminating in arc-shaped centrally spaced teeth grooved at their outer edges and having recesses at the ends of said grooves, and rods set into the grooves of the teeth and secured thereto by turning the ends into the recesses at the ends of the teeth.

FRANK J. BOHN.